US009158635B2

(12) United States Patent
Fernandez Alonso et al.

(10) Patent No.: US 9,158,635 B2
(45) Date of Patent: Oct. 13, 2015

(54) RECOVERY OF A SYSTEM FOR POLICY CONTROL AND CHARGING, SAID SYSTEM HAVING A REDUNDANCY OF POLICY AND CHARGING RULES FUNCTION

(75) Inventors: Susana Fernandez Alonso, Madrid (ES); Fabian Castro Castro, Madrid (ES)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 286 days.

(21) Appl. No.: 13/981,812

(22) PCT Filed: Jan. 10, 2011

(86) PCT No.: PCT/IB2011/050099
§ 371 (c)(1),
(2), (4) Date: Jul. 25, 2013

(87) PCT Pub. No.: WO2012/095697
PCT Pub. Date: Jul. 19, 2012

(65) Prior Publication Data
US 2013/0339783 A1    Dec. 19, 2013

(51) Int. Cl.
*G06F 11/00*      (2006.01)
*G06F 11/20*      (2006.01)
(Continued)

(52) U.S. Cl.
CPC ........ *G06F 11/2023* (2013.01); *G06F 11/2033* (2013.01); *G06F 11/2038* (2013.01);
(Continued)

(58) Field of Classification Search
CPC ............ G06F 11/2033; G06F 11/2038; G06F 11/2097; H04L 12/14; H04L 12/1403
See application file for complete search history.

(56) References Cited

U.S. PATENT DOCUMENTS

2007/0153676 A1* 7/2007 Baglin et al. .................. 370/216
(Continued)

FOREIGN PATENT DOCUMENTS

CN        101060703 A     10/2007
(Continued)

OTHER PUBLICATIONS

EPO, Int'l Search Report in PCT/IB2011/050099, Oct. 5, 2011.
(Continued)

*Primary Examiner* — Yolanda L Wilson
(74) *Attorney, Agent, or Firm* — Patent Portfolio Builders PLLC (57) ABSTRACT

A first Policy and Charging Rules Function "PCRF" server for recovery of a Policy and Charging Control "PCC" system. The PCC system also has a second PCRF server previously in charge of controlling an Internet Protocol Connectivity Access Network "IP-CAN" session previously established with a UE, and a PCRF-client. The first PCRF server includes a network interface unit of the first PCRF server arranged for receiving a modification request of the IP-CAN session from the PCRF-client after failure of the second PCRF server which was in active mode. The first PCRF server has a PCRF identifier which is shared with the second PCRF server that has failed. The first PCRF server now in active mode. The modification request requesting new rules for the IP-CAN session, including modification data and excluding access data and supported features for the IP-CAN session. The first PCRF server includes a processing unit of the first PCRF server arranged for determining that the IP-CAN session is unknown, and arranged for submitting a request from the network interface unit of the first PCRF server to the PCRF-client to provide all information that the PCRF-client has regarding the IP-CAN session. The information includes all data required to be sent for the IP-CAN session establishment and synchronization data. A Policy and Charging Rules Function "PCRF"-client for recovery of a Policy and Charging Control "PCC" system. Methods for recovery of a Policy and Charging Control "PCC" system with a first Policy and Charging Rules Function "PCRF" server in standby mode, a second PCRF server in active mode, and a PCRF-client, wherein an IP-CAN session is already established with a UE and controlled by the second PCRF server. A computer program embodied on a computer readable medium for recovery of a Policy and Charging Control "PCC" system.

21 Claims, 4 Drawing Sheets

(51) Int. Cl.
*H04L 12/14* (2006.01)
*H04L 12/24* (2006.01)
*H04M 15/00* (2006.01)
*H04W 4/24* (2009.01)

(52) U.S. Cl.
CPC ........ *H04L12/1407* (2013.01); *H04L 41/0668* (2013.01); *H04M 15/00* (2013.01); *H04M 15/66* (2013.01); *H04W 4/24* (2013.01); *G06F 11/2048* (2013.01)

(56) References Cited

U.S. PATENT DOCUMENTS

| | | | |
|---|---|---|---|
| 2012/0096177 A1* | 4/2012 | Rasanen | 709/228 |
| 2012/0177028 A1* | 7/2012 | Mo et al. | 370/351 |
| 2012/0221899 A1* | 8/2012 | Cervenak et al. | 714/48 |
| 2013/0003529 A1* | 1/2013 | Lopez Nieto et al. | 370/221 |
| 2013/0250750 A1* | 9/2013 | Nishida et al. | 370/216 |
| 2013/0325983 A1* | 12/2013 | Brady et al. | 709/206 |

FOREIGN PATENT DOCUMENTS

| | | |
|---|---|---|
| CN | 101141412 A | 3/2008 |
| CN | 100544264 C | 9/2009 |
| JP | 2010-278884 A | 12/2010 |

OTHER PUBLICATIONS

EPO, Written Opinion in PCT/IB2011/050099, Oct. 5, 2011.
3GPP, Study on PCRF Failure and Restoration (Release 9), Technical Report 29.816 V0.3.0, Nov. 2009.
3GPP, Policy and Charging Control Architecture (Release 9), Technical Specification 23.203 V9.3.0, Dec. 2009.
3GPP, Restoration Procedures (Release 9), Technical Specification 23.007 V9.5.0, Sep. 2010.
Cisco Sys. et al., Cisco Content Services Gateway—2nd Generation Release 3.5 Installation and Configuration Guide, Jun. 5, 2009, chapts. 10, 11.
3GPP, Policy and Charging Control Architecture (Release 9), Technical Specification 23.203 V9.5.0, Jun. 2010.
3GPP, Policy and Charging Control over Gx Reference Point (Release 9), Technical Specification 29.212 V9.5.0, Dec. 2010.
3GPP, Study on PCRF Failure and Restoration (Release 10), Technical Report 29.816 V10.0.0, Sep. 2010.
IETF, Diameter Base Protocol, Request for Comments 3588, Sep. 2003.

* cited by examiner

RECOVERY OF A SYSTEM FOR POLICY CONTROL AND CHARGING, SAID SYSTEM HAVING A REDUNDANCY OF POLICY AND CHARGING RULES FUNCTION

TECHNICAL FIELD

The present invention generally relates to recovery of a PCC system upon a PCRF failure. (As used herein, references to the "present invention" or "invention" relate to exemplary embodiments and not necessarily to every embodiment encompassed by the appended claims.) More specifically, the present invention generally relates to recovery of a PCC system upon a PCRF failure with PCRF redundancy.

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

PCC Architecture in 3GPP

Figure 1:
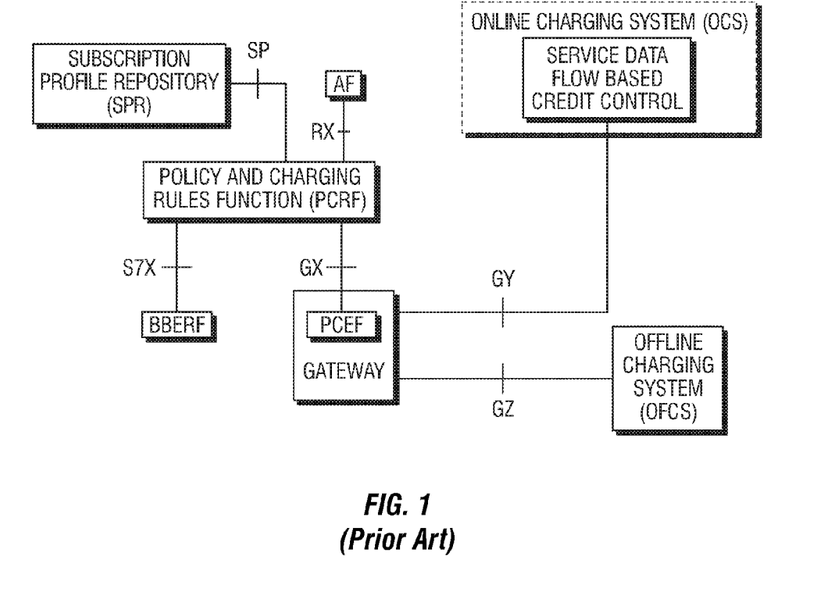
FIG. 1 shows PCC policy and charging control architecture.

The architecture that supports Policy and Charging Control functionality is depicted in FIG. 1. FIG. 1 has been taken from TS 23.203 (V.9.5.0) that specifies the PCC functionality for Evolved 3GPP Packet Switched domain, including both 3GPP accesses (GERAN/UTRAN/E-UTRAN) and Non-3GPP accesses. The nodes that would receive any impact from this invention have diagonal lines.

The Policy Control and Charging Rules Function (PCRF) is a functional element that encompasses policy control decision and flow based charging control functionalities. The PCRF provides network control regarding the service data flow detection, gating, QoS and flow based charging (except credit management) towards a Policy Control and Charging Enforcement Function (PCEF). The PCRF receives session and media related information from an Application Function (AF) and informs the AF of traffic plane events. The PCRF shall provision Policy Control and Charging (PCC) rules to the PCEF via a so-called Gx reference point. The PCRF shall inform the PCEF through the use of PCC rules on the treatment of each service data flow that is under PCC control, in accordance with the PCRF policy decision(s).

The Application Function (AF) is an element offering applications in which service is delivered in a different layer (i.e. transport layer) from the one the service has been requested (i.e. signaling layer), the control of IP bearer resources according to what has been negotiated. One example of an AF is the Proxy Call Session Control Function (P-CSCF) of the IM CN subsystem. The AF shall communicate with the PCRF to transfer dynamic session information (i.e. description of the media to be delivered in the transport layer). This communication is performed using a so-called Rx interface.

The PCEF encompasses service data flow detection (based on filters definitions included in the PCC rules), as well as online and offline charging interactions (not described here) and policy enforcement. Since the PCEF is the one handling the bearers, the PCEF is where the QoS is being enforced for the bearer according to the QoS information coming from the PCRF. This functional entity, namely the PCEF, is located at the Gateway (e.g. GGSN in the GPRS case, and PDG in the WLAN case). For the cases where there is a Proxy Mobile IP (PMIP) instead of a GPRS Tunneling Protocol (GTP) between a Bearer Binding and Event Reporting Function (BBERF) and the PCEF, the bearer control is done in the BBERF instead. For the purpose of the present invention, the BBERF behaves as the PCEF.

Figure 2:
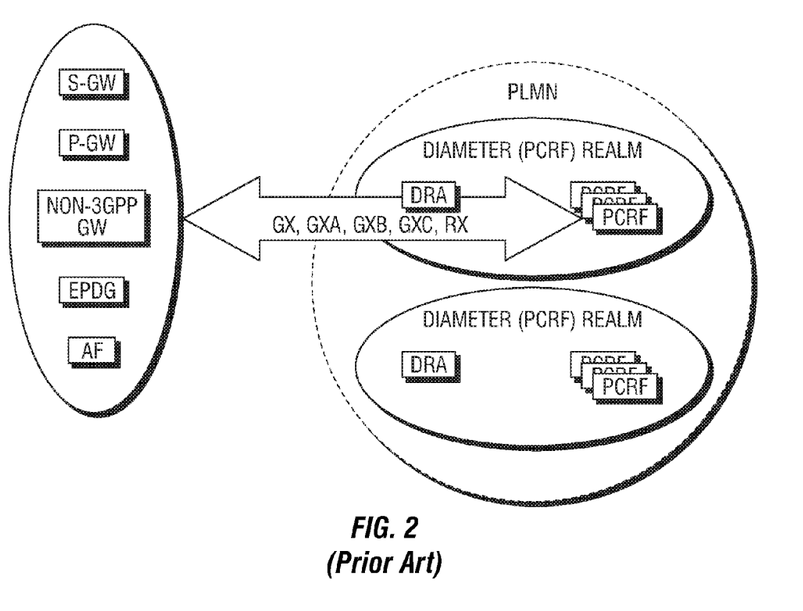
FIG. 2 shows a flow chart regarding a prior art PCC architecture.

When multiple addressable PCRFs have been deployed in a Diameter realm, an optional logical Diameter Routing Agent (DRA) function is enabled in the PCC architecture. This entity ensures that all Diameter sessions for Gx, Gxx, S9 and Rx interfaces, find the same PCRF. See FIG. 2.

PCRF Failover and Recovery Mechanisms in the Standards

The PCC architecture has been defined in 3GPP without considering the failover and recovery mechanisms of the involved entities. 3GPP specifies the failover and restoration mechanisms for most of the core network elements in 3GPP TS 23.007. Though PCC architecture has been so far out of the scope of this specification, there is some work in 3GPP to incorporate PCC in future versions.

On the other hand, 3GPP has analyzed different PCRF failover and recovery scenarios that are documented in 3GPP TR 29.816.

In a scenario where more than one PCRF exists in the PCC architecture, upon failure of a PCRF, an alternative PCRF is contacted. This solution assumes that no interaction exists amongst the more than one PCRF, and that a central entity (a so-called DRA) provides to any PCRF-client (namely PCEF or BBERF) information to select an active PCRF. In order to update the alternative PCRF, 3GPP proposes that each PCRF-client (PCEF, BBERF) stores the session data available before failing the formerly active PCRF, and updates the alternative PCRF with said session data. In a scenario where just one PCRF exists, or where no alternative PCRF exists to take the role and activities of the failing PCRF, 3GPP proposes that, upon recovery of the failing PCRF, each PCRF-client (PCEF) updates the recovering PCRF with session data previously saved. More specifically, the PCRF-client in this approach is aware of the PCRF failure and thus requests the DRA to provide information about other active PCRF.

However, 3GPP does not dictate the specific data and the frequency which the session data is saved for an eventual PCRF recovery procedure. Saving all session data at any time they are modified produces a significant work load for each PCRF-client, and the provision of the saved session data from each PCRF-client to the new active PCRF, or to the recovering PCRF, also produces a quite significant work load for the new active PCRF, or recovering PCRF, as well as for each PCRF-client.

PCC Failover Mechanisms in a Real Deployments

Some products (e.g. the Ericsson SAPC implementing the PCRF) are developing solutions based on the use of geographical redundancy. Some platforms allow that geographical redundancy at host level, i.e. there are two instances of the same PCRF, primary and stand-by. With this option, when the primary PCRF instance fails, the stand-by PCRF can take the control without involving the clients (e.g. PCEF). From the PCRF client perspective, there is a unique PCRF with a unique IP address and a unique Diameter Destination-Host.

Geographical Redundancy at host level is advantageous since

- it is transparent to the clients (e.g. PCEF, BBERF or AF)
- extra-signaling is avoided. No redirection mechanism has to be supported to find an alternative node
- it is cheaper. High reliability is achieved without needs for a central entity such as the above DRA For these solutions based on conventional Geographical redundancy it is required that the primary PCRF instance and the stand by maintain the same replicated information. The standby instance requires having access to the same static information (configuration and provisioning information) than the primary one. Replication of dynamic information (session information) is also necessary if it is required that sessions on going are not affected when the stand by node takes the control upon a primary failover. However, solutions where the session information is replicated between the active and standby PCRF instances require that the active PCRF instance shall keep the stand-by PCRF instance updated in each session modification event, what may provoke high internal processing in the node, performance drop, system instability, and also requires a high capacity update link between PCRF instances.

For this reason conventional geographical redundancy solutions limit the replication to static information. With this approach at least it is ensured that the stand-by instance can take the control of all the new sessions being established, since it will have replicated all the non-volatile data (e.g. subscription data) in its internal (or external) data base. Since the volatile data is lost, ongoing sessions cannot be handled.

Problems with Existing Solutions

The alternatives proposed in 3GPP in TR 29.816 distinguish between deployments of multiple PCRF with DRA, and single PCRF. In a single PCRF deployment, the main drawback is that sessions cannot be maintained or can be maintained during a period of time but with the risk of obsolete information. In the solutions based on multiple PCRF, the PCRF client (e.g. PCEF, BBERF) shall detect the PCRF failure, and shall take actions to come through the situation detected. All the alternatives imply big impacts on the PCRF client, such as storing PCRF session data and updating procedures towards the active PCRFs.

On the other hand, as described in the previous clause, current deployments already offer some geographical redundancy solutions so that an alternative instance of the same PCRF node can take the control of the PCC interactions. As said before, those solutions would only work for the new sessions being established, since the PCRF has lost the dynamic data for the active sessions. In order for the PCRF to obtain the PCC rules applicable to a particular IP-CAN session, it needs specific access information, supported features, and subscription information.

The access information is conventionally obtained in the initial IP-CAN session establishment (i.e. in the first interaction that the PCEF has with the PCRF for a certain session, the client will provide all available access data), and, if the PCRF subscribed to changes over that information, in IP-CAN session modification operations received when a specific access data is modified (in this case, only the modified data may be received).

On the other hand, the features that both the PCEF and the PCRF supports are also negotiated during the first interaction and would apply during the whole IP-CAN session. The subscription information is obtained from an external or internal database.

With geographical redundancy in a unique logical entity, the PCEF will not be aware that the PCRF has failed, since a different PCRF has taken the control. Thus, when the PCEF has to contact the PCRF for a particular active IP-CAN session (e.g. some access data has changed), the PCEF will initiate an IP-CAN session modification towards the known PCRF. Since this message might only include data related to the specific change, the new PCRF would not have enough information to provide valid PCC rules.

One possible solution to this problem in the conventional approach can be based on a synchronization mechanism between PCRFs, i.e., the active PCRF shall keep the stand-by PCRF updated with the relevant session data. However, due to the nature of this node, the dynamic data can be changed very often, what would require high internal processing in the node.

Figure 3:
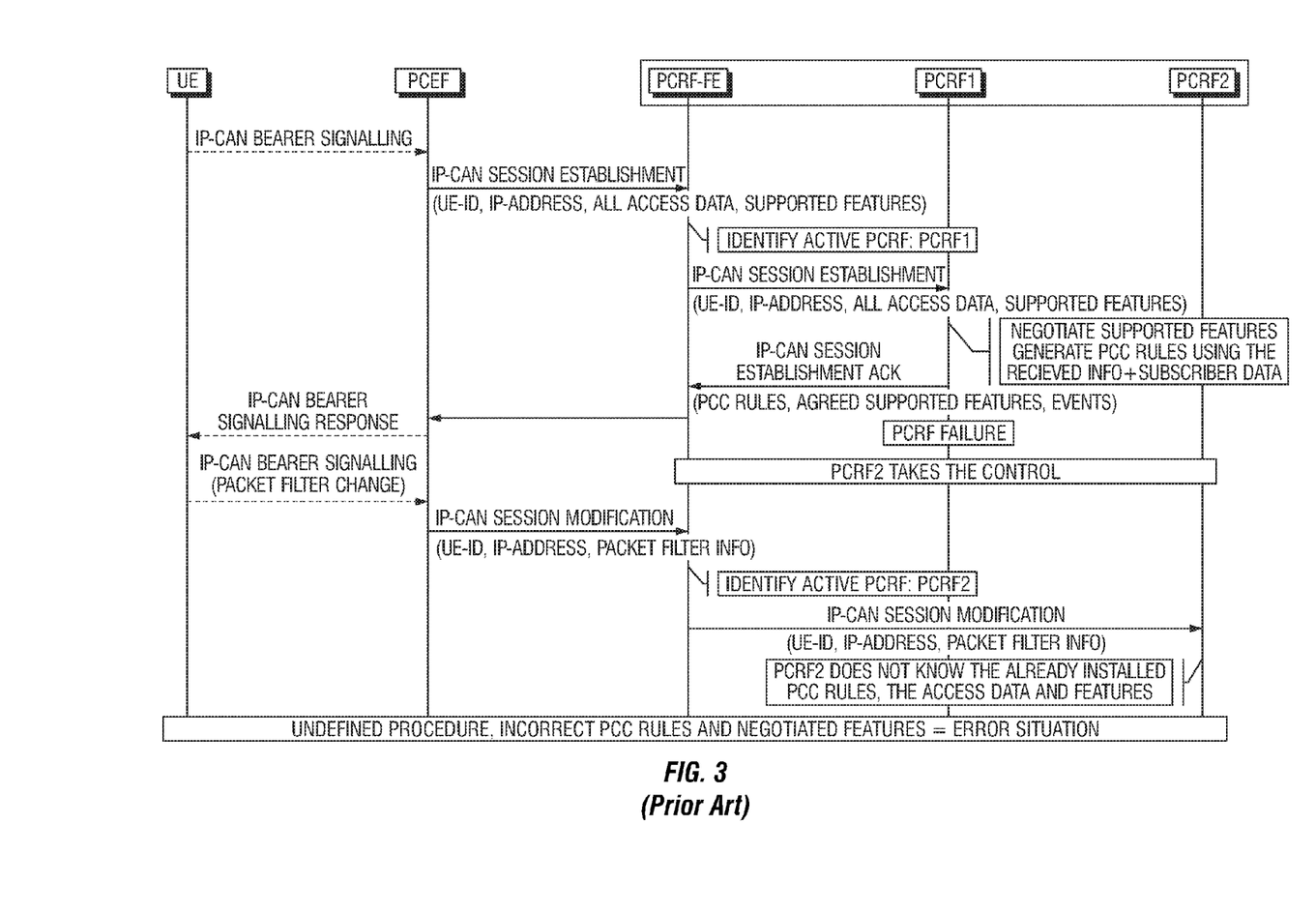
FIG. 3 shows an IP-CAN session modification upon PCRF1 failure.

FIG. 3 illustrates the described problem.

1. The UE initiates a PDN connection as per normal procedures

2. The PCEF initiates an IP-CAN Session Establishment towards the PCRF. It includes the identity of the subscriber, the features supported by the PCEF and the access data information available at the PCEF.

3. The request reaches the PCRF-FE that will address the request to the active PCRF (PCRF1).

4. The PCRF1 will make the policy decisions using the received access data and permanent subscriber data. The PCRF will derive the supported features using the feature information received in the request.

5. The PCRF1 provides the derived PCC rules, supported features and required events in the response.

NOTE: It is assumed that all the available access information is received in the request. According to the standard, it is also possible that, upon event-trigger subscription, if the PCEF has not included relevant information for the related subscribed events, it will send that information in a new request.

6. PCRF-FE forwards the request to the PCEF

7. The PCEF responds back to the UE, following current procedures.

8. PCRF1 fails. PCRF-FE internally assigns a new PCRF (PCRF2) that can only take control of existing IP-CAN sessions.

9. The UE initiates a new interaction that requires PCC control (e.g. TFT change).

NOTE: The interaction can also be initiated by any other entity in the network (e.g. SGSN or HSS)

10. The PCEF initiates an IP-CAN Session Modification towards the PCRF. It includes the IP-Address of the subscriber, the applicable event (e.g. TFT change) and the information related to that event (e.g. TFT filters).

11. The request reaches the PCRF-FE that will address the request to the new active PCRF (PCRF2).

12. The PCRF2 does not have dynamic information for this IP-CAN session, since all volatile data have been lost. Thus it is not aware of the PCC decisions made previously, nor the features that the PCEF supports. It does not know the access data relevant for the PCC Rules. Thus, either an error is generated, or incorrect PCC information will be provided.

Under this approach, dynamic data for any existing session are lost, and such existing sessions cannot be maintained.

Since the PCRF-client (PCEF, BBERF) is neither aware of the formerly active PCRF failure nor aware of the new active PCRF under this redundancy approach, if any modification of an already established IP-CAN session occurs, the PCRF-client simply submits those data related to the modification towards the new active PCRF, so that, even if the disclosure of 3GPP TR 29.816 v10.0.0 were to be considered, each PCRF-client cannot submit any previously saved session data simply because it is unaware of communicating with a new active PCRF.

In this situation, the new active PCRF knows neither decisions previously made by the formerly active PCRF, nor features supported by the PCEF, nor those access data required to provide PCC rules, because all these data had been received by the formerly active PCRF with the request for establishment of this IP-CAN session.

There is thus a need for an enhanced PCC architecture with an autonomous PCRF redundancy, that is, without participation of a central entity such as the above DRA, wherein a new active PCRF can obtain those dynamic data currently applying to existing IP-CAN sessions, which were received by the formerly active PCRF with the request for establishment of such IP-CAN sessions.

SUMMARY

To overcome the aforementioned problems, or at least to mitigate them, the present invention provides for a new PCRF server configured to act as a standby PCRF to replace a formerly active PCRF, wherein both standby PCRF and formerly active PCRF share a same addressable PCRF identifier, the PCRF server arranged for obtaining from each PCRF-client those dynamic data currently applying to existing IP-CAN sessions in each PCRF-client upon receipt of an IP-CAN session modification; and a corresponding method for a standby PCRF server becoming a new active PCRF server to handle existing IP-CAN sessions previously handled by a formerly active PCRF server.

The present invention pertains to a first Policy and Charging Rules Function "PCRF" server for recovery of a Policy and Charging Control "PCC" system. The PCC system also has a second PCRF server previously in charge of controlling an Internet Protocol Connectivity Access Network "IP-CAN" session previously established with a user entity "UE", and a PCRF-client. The first PCRF server comprising a network interface unit of the first PCRF server arranged for receiving a modification request of the IP-CAN session from the PCRF-client after failure of the second PCRF server which was in active mode. In particular, the IP-CAN session modification may have been initiated from the UE or from the network (e.g. Home Subscriber Server "HSS"). The first PCRF server has a PCRF identifier which is shared with the second PCRF server that has failed. The first PCRF server now in active mode. The modification request requesting new rules for the IP-CAN session, including modification data and excluding access data and supported features for the IP-CAN session. The first PCRF server comprising a processing unit of the first PCRF server arranged for determining that the IP-CAN session is unknown, and arranged for submitting a request from the network interface unit of the first PCRF server to the PCRF-client to provide all information that the PCRF-client has regarding the IP-CAN session. The information includes all data required to be sent for the IP-CAN session establishment and synchronization data.

The present invention pertains to a Policy and Charging Rules Function "PCRF"-client for recovery of a Policy and Charging Control "PCC" system. The PCC system also has a first Policy PCRF server in standby mode, a second PCRF server in active mode, and, wherein an IP-CAN session is already established with a UE and controlled by the second PCRF server. The PCRF-client comprises a network interface unit of the PCRF-client arranged for receiving a modification of the IP-CAN session, which may have been initiated from the UE or from the network (e.g. Home Subscriber Server), after the second PCRF server has failed. The PCRF-client comprises a processing unit of the PCRF-client arranged for submitting a request from the interface unit of the PCRF-client to the first PCRF server, by using a PCRF identifier of the second PCRF server, for new control rules for the IP-CAN session. The request including modification data and excluding access data and supported features for the IP-CAN session. The first PCRF server now in active mode. The first PCRF server sharing the PCRF identifier with the second PCRF server that has failed. The network interface unit of the PCRF-client arranged for receiving a request from the first PCRF server requesting all information that the PCRF-client has regarding the IP-CAN session. The information including all data required to be sent for the IP-CAN session establishment and synchronization data. The PCRF-client comprises a memory of the PCRF-client in communication with the network interface unit and the processing unit of the PCRF-client and arranged for storing IP-CAN session information. The network interface unit of the PCRF-client arranged for sending to the first PCRF server all the information the PCRF-client has in the memory of the PCRF-client regarding the IP-CAN session, including access data, supported features, IP-CAN session establishment data and, optionally, currently installed control rules for the IP-CAN session as synchronization data. The network interface unit of the PCRF-client arranged for receiving from the first PCRF server the new control rules for the IP-CAN session and, optionally, indications to delete one or more previously installed control rules not to be further applied, if any. The processing unit of the PCRF-client arranged for enforcing the new control rules for the IP-CAN session and for deleting those previously installed rules that are not to be applied.

The present invention pertains to a method for recovery of a Policy and Charging Control "PCC" system with a first Policy and Charging Rules Function "PCRF" server in standby mode, a second PCRF server in active mode, and a PCRF-client, wherein an IP-CAN session is already established with a UE and controlled by the second PCRF server. The method comprises the steps of receiving at a network interface unit of the first PCRF server a modification request of the IP-CAN session from the PCRF-client after failure of the second PCRF server which was in active mode. The first PCRF server has a PCRF identifier which is shared with the second PCRF server that has failed. The first PCRF server now in active mode. The modification request requesting new rules for the IP-CAN session, including modification data and excluding access data and supported features for the IP-CAN session. There is the step of determining by a processing unit of the first PCRF server that the IP-CAN session is unknown. There is the step of sending a request from the network interface of the first PCRF server to the PCRF-client to provide all information that the PCRF-client has regarding the IP-CAN session, the information including all data required to be sent for the IP-CAN session establishment and synchronization data.

The present invention pertains to a method for recovery of a Policy and Charging Control "PCC" system with a first Policy and Charging Rules Function "PCRF" server in standby mode, a second PCRF server in active mode, and a PCRF-client, wherein an IP-CAN session is already established with a UE and controlled by the second PCRF server. The method comprises the steps of receiving at a network interface unit of the PCRF-client a modification of the IP-CAN session, initiated from the UE or the network, after the second PCRF server has failed. There is the step of sending a request from the interface unit of the PCRF-client to the first PCRF server, by using a PCRF identifier of the second PCRF server, for new control rules for the IP-CAN session. The request includes modification data and excludes access data and supported features for the IP-CAN session. The first PCRF server now in active mode. The first PCRF server shares the PCRF identifier with the second PCRF server that has failed. There is the step of receiving at the network interface unit of the PCRF-client a request from the first PCRF server requesting all information that the PCRF-client has regarding the IP-CAN session. The information includes all data required to be sent for the IP-CAN session establishment and synchronization data. There is the step of sending from the network interface unit of the PCRF-client to the first PCRF server all the information the PCRF-client has in a memory of the PCRF-client regarding the IP-CAN session, including access data, supported features, IP-CAN session establishment data and, optionally, control rules for the IP-CAN session as synchronization data. There is the step of receiving at the network interface unit of the PCRF-client from the first PCRF server the new control rules for the IP-CAN session and, optionally, indications to delete one or more previously installed control rules not to be further applied, if any. There is the step of enforcing the new control rules with a processing unit of the PCRF-client for the IP-CAN session and deleting those previously installed rules that are not to be applied, if any.

The present invention pertains to a computer program embodied on a computer readable medium for recovery of a Policy and Charging Control "PCC" system with a first Policy and Charging Rules Function "PCRF" server in standby mode, a second PCRF server in active mode, and a PCRF-client, wherein an Internet Protocol Connectivity Access Network "IP-CAN" session is already established with a user entity "UE" and controlled by the second PCRF server. The computer program comprises the computer generated steps for carrying out the above methods when running in a computer.

The present invention thus provides for a technique for recovery of a PCC system with a first PCRF server in active mode, a second PCRF server in standby mode, and a PCRF-client wherein an IP-CAN session is already established with a UE and controlled by the first PCRF server, the technique comprising the steps of:
- configuring a PCRF-client with a PCRF identifier for addressing any of a first or a second PCRF server in active mode, wherein the PCRF identifier is shared by both first PCRF server and second PCRF server; alternatively, the PCRF identifier may be obtained by using diameter realm routing procedures (e.g. based on UE-NAI, PDN); if such were the case, the PCRF identifier may be the destination-host AVP in diameter.
- upon an IP-CAN session establishment with a UE, by using the PCRF identifier, the PCRF-client requesting control rules to the first PCRF server, which is operating in active mode, the request including access data and supported features;
- receiving at the PCRF-client the control rules from the first PCRF server, and enforcing the control rules at the PCRF-client for the IP-CAN session;
- storing at the PCRF-client the access data, the supported features and the control rules for the IP-CAN session;
- upon failure of the first PCRF server, the second PCRF server entering in active mode;
- upon receiving a modification of the IP-CAN session from the UE or the network, by using the PCRF identifier, the PCRF-client requesting new control rules for the IP-CAN session to the second PCRF server, which is operating in active mode, the request including modification data and excluding the access data and the supported features for the IP-CAN session;
- determining at the second PCRF server that the IP-CAN session is unknown and requesting from the second PCRF server synchronization data for the IP-CAN session to the PCRF-client;
- submitting from the PCRF-client to the second PCRF server the stored access data, supported features and, optionally, control rules currently installed for the IP-CAN session as synchronization data;
- processing the received synchronization data and the modification data at the second PCRF server in order to generate the new control rules for the IP-CAN session and, optionally, determining those previous control rules to be deleted; and
- submitting from the second PCRF server the new control rules for the IP-CAN session to the PCRF-client and, optionally, indications to delete one or more previously installed control rules, if any.

In an embodiment of the invention, the PCRF-client may submit to the new active PCRF server those control rules currently installed for the IP-CAN session. Where this is the case, the new active PCRF server processes those control rules along with the received modification data and other synchronization data, determines which previously installed control rules have to be deleted, if any, and submits to the PCRF-client corresponding indications. In other embodiment, the PCRF-client submits to the new active PCRF server those control rules currently installed for the IP-CAN session, the new active PCRF server processes those control rules along with the received modification data and other synchronization data, and determines a complete set of new control rules to replace the currently installed ones, without submitting any particular indication to delete any currently installed control rules. In a still further embodiment, the PCRF-client does not submit control rules currently installed for the IP-CAN session to the PCRF server and, upon receiving the new control rules to be enforced, the PCRF-client is arranged for determining which currently installed control rules should remain and which ones should be deleted or replaced. Advantageously in this technique, the step of the second PCRF server entering in active mode may comprise a step of a PCRF Front-End routing requests with the PCRF identifier towards the second PCRF server upon detecting a failure of the first PCRF server.

BRIEF DESCRIPTION OF THE DRAWINGS

In the accompanying drawings, the preferred embodiments of the invention and preferred methods of practicing the invention are illustrated in which.

DETAILED DESCRIPTION

Figure 5:
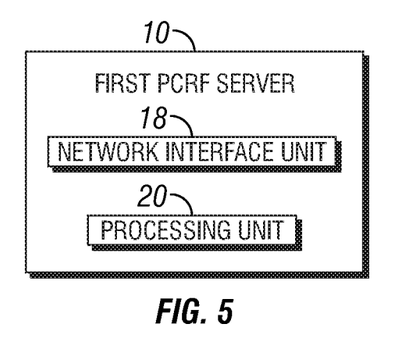
FIG. 5 is a block diagram of the PCRF of the present invention.

Referring now to the drawings wherein like reference numerals refer to similar or identical parts throughout the several views, and more specifically to FIG. 5 thereof, there is shown a first Policy and Charging Rules Function "PCRF" server 10 for recovery of a Policy and Charging Control "PCC" system. The PCC system also has a second PCRF server 14 previously in charge of controlling an IP-CAN session previously established with a UE 16, and a PCRF-client 12. The first PCRF server 10 comprising a network interface unit 18 of the first PCRF server 10 arranged for receiving a modification request of the IP-CAN session from the PCRF-client 12 after failure of the second PCRF server 14 which was in active mode. The first PCRF server 10 has a PCRF identifier which is shared with the second PCRF server 14 that has failed. The first PCRF server 10 behaves now in active mode. The modification request requesting new rules for the IP-CAN session, including modification data and excluding access data and supported features for the IP CAN session. The first PCRF server 10 comprising a processing unit 20 of the first PCRF server 10 arranged for determining that the IP CAN session is unknown, and arranged for submitting a request from the network interface unit 18 of the first PCRF server 10 to the PCRF-client 12 to provide all information that the PCRF-client 12 has regarding the IP-CAN session. The information includes all data required to be sent for the IP-CAN session establishment and synchronization data.

The network interface unit 18 of the first PCRF server 10 may be arranged for receiving all the information the PCRF-client 12 has regarding the IP-CAN session, including access data, supported features, IP-CAN session establishment data and, optionally, control rules for the IP-CAN session as synchronization data. The processing unit 20 of the first PCRF server 10 may be arranged for processing the received information regarding the IP-CAN session, including access data, supported features, IP-CAN session establishment data and control rules for the IP-CAN session, if any, as synchronization data in order to generate new control rules for the IP-CAN session. The network interface unit 18 of the first PCRF server 10 may be arranged for submitting the new control rules for the IP-CAN session to the PCRF-client 12. Optionally, the network interface unit 18 of the first PCRF server 10 may also be arranged for submitting indications to delete one or more previously installed control rules, if any.

Figure 6:
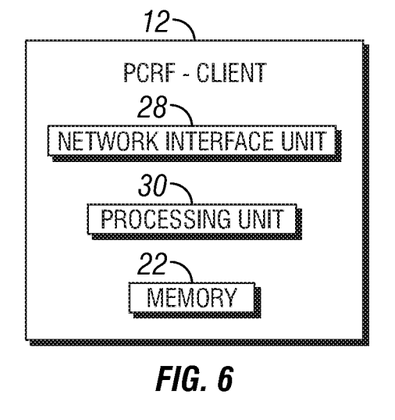
FIG. 6 is a block diagram of the PCRF-client of the present invention.

The present invention pertains to a PCRF-client 12, as shown in FIG. 6, for recovery of a PCC system. The PCC system also has a first Policy PCRF server 10 in standby mode, a second PCRF server 14 in active mode, and, wherein an IP CAN session is already established with a UE 16 and controlled by the second PCRF server 14. The PCRF-client 12 comprises a network interface unit 28 of the PCRF-client 12 arranged for receiving a modification of the IP-CAN session from the UE 16, or from a network node such as a Home Subscriber Server, which is not illustrated in any drawing, after the second PCRF server 14 has failed. The PCRF-client 12 comprises a processing unit 30 of the PCRF-client 12 arranged for submitting a request from the network interface unit 28 of the PCRF-client 12 to the first PCRF server 10, using a PCRF identifier of the second PCRF server 14, for new control rules for the IP-CAN session. The request including modification data and excluding access data and supported features for the IP-CAN session. The first PCRF server 10 becomes now in active mode. The first PCRF server 10 sharing the PCRF identifier with the second PCRF server 14 that has failed. The network interface unit 28 of the PCRF-client 12 arranged for receiving a request from the first PCRF server 10 requesting all information that the PCRF-client 12 has regarding the IP-CAN session. The information including all data required to be sent for the IP-CAN session establishment and synchronization data. The PCRF-client comprises a memory 22 of the PCRF-client 12 in communication with the network interface unit 28 and the processing unit 30 of the PCRF-client 12 arranged for storing IP-CAN session information. The network interface unit 28 of the PCRF-client 12 arranged for sending to the first PCRF server 10 all the information the PCRF-client 12 has in the memory 22 of the PCRF-client 12 regarding the IP-CAN session, including access data, supported features, IP-CAN session establishment data and, optionally, control rules for the IP-CAN session as synchronization data. The network interface unit 28 of the PCRF-client 12 is arranged for receiving from the first PCRF server 10 the new control rules for the IP-CAN session and, optionally, indications to delete one or more previously installed control rules, if any. The processing unit 30 of the PCRF-client 12 is arranged for enforcing the new control rules for the IP-CAN session and, if thus indicated, for deleting those one or more previously installed control rules not to be further applied.

The memory 22 of the PCRF-client 12 may be arranged for storing the access data, the supported features and the control rules for the IP-CAN session received from the second PCRF server 14 before the second PCRF server 14 has failed.

The present invention pertains to a method for recovery of a PCC system with a first PCRF server 10 in standby mode, a second PCRF server 14 in active mode, and a PCRF-client 12, wherein an IP-CAN session is already established with a UE 16 and controlled by the second PCRF server 14. The method comprises the steps of receiving at a network interface unit 18 of the first PCRF server 10 a modification request of the IP-CAN session from the PCRF-client 12 after failure of the second PCRF server 14 which was in active mode. The first PCRF server 10 has a PCRF identifier which is shared with the second PCRF server 14 that has failed. The first PCRF server 10 becomes now in active mode. The modification request requesting new rules for the IP-CAN session, including modification data and excluding access data and supported features for the IP CAN session. There is the step of determining by a processing unit 20 of the first PCRF server 10 that the IP CAN session is unknown. There is the step of sending a request from the network interface of the first PCRF server 10 to the PCRF-client 12 to provide all information that the PCRF-client 12 has regarding the IP-CAN session, the information including all data required to be sent for the IP-CAN session establishment and synchronization data.

There may be the step of receiving by the network interface unit 18 of the first PCRF server 10 all the information the PCRF-client 12 has regarding the IP-CAN session, including access data, supported features, IP-CAN session establishment data and, optionally, previous control rules currently installed for the IP-CAN session as synchronization data. There may be the step of processing with the processing unit 20 of the first PCRF server 10 the received synchronization data and the modification data in order to generate new control rules for the IP-CAN session. There may be the step of sending from the network interface unit 18 of the first PCRF server 10 the new control rules for the IP-CAN session to the PCRF-client 12 and, optionally, indications to delete one or more previously installed control rules, if any.

The present invention pertains to a method for recovery of a PCC system with a first PCRF server 10 in standby mode, a second PCRF server 14 in active mode, and a PCRF-client 12, wherein an IP CAN session is already established with a UE 16 and controlled by the second PCRF server 14. The method comprises the steps of receiving at a network interface unit 28 of the PCRF-client 12 a modification of the IP-CAN session from the UE 16, or from a network node such as a Home Subscriber Server, after the second PCRF server 14 has failed. There is the step of sending a request from the interface unit of the PCRF-client 12 to the first PCRF server 10 using a PCRF identifier of the second PCRF server 14 for new control rules for the IP-CAN session. The request includes modification data and excludes access data and supported features for the IP-CAN session. The first PCRF server 10 now becomes in active mode. The first PCRF server 10 shares the PCRF identifier with the second PCRF server 14 that has failed. There is the step of receiving at the network interface unit 28 of the PCRF-client 12 a request from the first PCRF server 10 requesting all information that the PCRF-client 12 has regarding the IP-CAN session. The information includes all data required to be sent for the IP-CAN session establishment and synchronization data. There is the step of sending from the network interface unit 28 of the PCRF-client 12 to the first PCRF server 10 all the information the PCRF-client 12 has in a memory 22 of the PCRF-client 12 regarding the IP-CAN session, including access data, supported features, IP-CAN session establishment data and, optionally, currently installed control rules for the IP-CAN session as synchronization data. There is the step of receiving at the network interface unit 28 of the PCRF-client 12 from the first PCRF server 10 the new control rules for the IP-CAN session and, optionally, indications to delete one or more previously installed control rules, if any. There is the step of enforcing the new control rules with a processing unit 30 of the PCRF-client 12 for the IP-CAN session and, if thus indicated, of deleting those one or more previously installed control rules not to be further applied.

There may be the step of storing in the memory 22 of the PCRF-client 12 the access data, the supported features and the control rules for the IP-CAN session received from the second PCRF server 14 before the second PCRF server 14 has failed.

The present invention pertains to a computer program embodied on a computer readable medium for recovery of a Policy and Charging Control "PCC" system with a first Policy and Charging Rules Function "PCRF" server 10 in standby mode, a second PCRF server 14 in active mode, and a PCRF-client 12, wherein an Internet Protocol Connectivity Access Network "IP-CAN" session is already established with a user entity "UE" and controlled by the second PCRF server 14. The computer program comprises the computer generated steps for carrying out the above methods when running in a computer.

In the operation of the invention, in a scenario as the one described in the background above, based on Primary/Hot/active-Standby model, where one of the PCRFs, PCRF1 (the one acting in active mode) is handling traffic while the other, PCRF2, the one acting in Standby mode, is there in case of failure of the first one, the invention proposes a synchronization mechanism between PCRF client and PCRF.

Once the standby PCRF2 becomes acting due to a failure of the active PCRF1, the PCRF2 upon the reception of an IP-CAN Session Modification (Diameter CCR modification request) from the PCRF client for certain user IP CAN session, issues a request towards the PCRF client indicating to send all the information it has regarding that session. This information comprises, at least, all the data (Diameter AVPs) that are mandatory according to the standard to be sent in an IP-CAN Session Establishment (CCR initial) and, optionally, any other information the PCEF could have for that session, such as PCC rules downloaded by PCRF1 before it failed.

Figure 4:
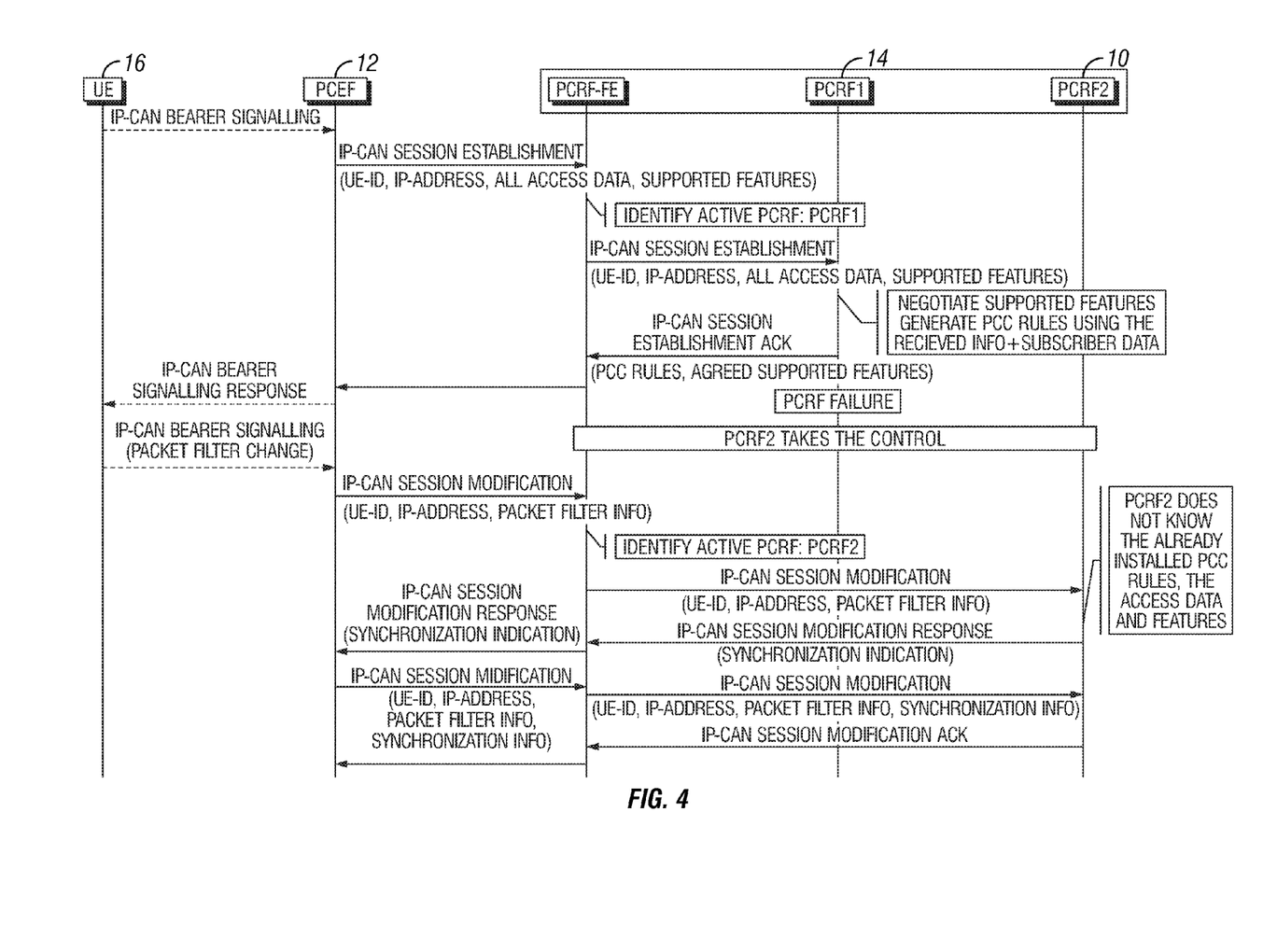
FIG. 4 shows an IP-CAN session modification upon PCRF1 failure of the present invention.

FIG. 4 shows a sequence diagram according to this invention. When PCRF2 receives an IP-CAN Session Modification (Diameter CCR update) for an IP session, and PCRF2 does not have information about that session, it responds with a synchronization indication to the PCEF requiring the sending of the available session information.

At this point the PCEF will know that it has to resend the IP-CAN session modification but this time containing all the session information that PCEF has, what has been marked as synchronization information in previous figure. This information comprises, at least, all the data (AVPs) that are mandatory according to the standard to be sent in an IP-CAN Session Establishment (CCR initial).

According to the standard, in an IP-CAN Session Establishment, the PCEF shall supply user identification within the Subscription-Id AVP and other attributes to allow the PCRF to identify the rules to be applied. The other attributes shall include the supported features, the type of IP-CAN within the IP-CAN-Type AVP, the type of the radio access technology within the RAT-Type AVP, the PDN information, if available, within the Called-Station-ID AVP, the PDN connection identifier, if available, within the PDN-Connection-ID AVP, the UE 16 IPv4 address within the Framed-IP-Address and/or the UE 16 IPv6 prefix within the Framed-IPv6-Prefix AVP and the UE 16 time zone information within 3GPP-MS-TimeZone AVP, if available. The PCEF may also include the Access-Network-Charging-Address and Access-Network-Charging-Identifier-Gx AVPs in the CC-Request. Furthermore, if applicable for the IP-CAN type, the PCEF may indicate the support of network-initiated bearer request procedures by supplying the Network-Request-Support AVP. The PCEF shall also include the APN-AMBR if available using the APN-Aggregate-Max-Bitrate-DL/UL AVPs. If available, the PCEF shall also provide an indication if the default bearer is requested to be used for IMS signaling using the Bearer-Usage AVP.

When the PCRF receives the IP-CAN session modification with all the information required, the PCRF is able to rebuilt the internal session and evaluate and take decisions providing a correct response to the PCEF. The new result downloaded by the PCRF shall overwrite any previous result stored in the PCEF for that session.

This invention has the following advantages:
It provides a mechanism by which, if for any reason the PCRF does not have accurate session information, the PCRF can instruct the PCEF to provide the required information.
It solves the problem of a single point of failure in the PCRF based on a geographical redundancy solution that avoids the need to replicate session dynamic information between PCRFs. Solutions where the session information is replicated between the active and standby node require that the active PCRF shall keep the stand-by PCRF updated with session data, what provokes high internal processing in the node, performance drop, system instability, and also requires a high capacity update link between PCRFs.
It improves user perception since the mechanism ensures that the current established session can be maintained even though one PCRF is down.
The operator can continue providing service to users affected by the PCRF restart and thus continue charging for the used services.
It is an enhanced alternative approach to the solutions described in 3GPP, solutions that imply impacts in the PCRF client (PCEF, BBERF) related with PCRF session storage and session updating procedures. Besides, in the solution proposed, the PCEF is not aware of any PCRF failure, maintaining always contact with the same PCRF logical node (active and stand-by instances constitute a single logical node) being the geographical redundancy mechanism transparent for the PCEF client. From the PCEF perspective, the solution proposed in the invention does not imply a significantly different behavior than the one currently performed by the PCEF client.

Although the invention has been described in detail in the foregoing embodiments for the purpose of illustration, it is to be understood that such detail is solely for that purpose and that variations can be made therein by those skilled in the art without departing from the scope of the invention except as it may be described by the following claims.

The invention claimed is:

1. A method for recovery of a Policy and Charging Control (PCC) system with a first Policy and Charging Rules Function (PCRF) server in standby mode, a second PCRF server in active mode, and a PCRF client, wherein an Internet Protocol Connectivity Access Network (IP-CAN) session is already established with a user entity (UE) and controlled by the second PCRF server, the method comprising:
   receiving at a network interface unit of the first PCRF server a modification request of the IP-CAN session from the PCRF client after failure of the second PCRF server which was in active mode, the first PCRF server having a PCRF identifier which is shared with the second PCRF server that has failed, the first PCRF server now in active mode, the modification request requesting new rules for the IP-CAN session including modification data and excluding access data and supported features for the IP-CAN session;
   determining by a processing unit of the first PCRF server that the IP-CAN session is unknown; and
   sending a request from the network interface unit of the first PCRF server to the PCRF client to provide all information that the PCRF client has regarding the IP-CAN session, the information including all data required to be sent for the IP-CAN session establishment and synchronization data.

2. The method of claim 1, further comprising receiving by the network interface unit of the first PCRF server all the information the PCRF client has regarding the IP-CAN session, including access data, supported features, and IP-CAN session establishment data as synchronization data.

3. The method of claim 2, further comprising receiving by the network interface unit of the first PCRF server as synchronization data from the PCRF client currently installed control rules for the IP-CAN session.

4. The method of claim 3, further comprising processing with the processing unit of the first PCRF server the received synchronization data and the modification data in order to generate new control rules for the IP-CAN session.

5. The method of claim 4, further comprising sending from the network interface unit of the first PCRF server the new control rules for the IP-CAN session to the PCRF client.

6. The method of claim 5, further comprising sending from the network interface unit of the first PCRF server to the PCRF client indications to delete one or more previously installed control rules.

7. A method for recovery of a Policy and Charging Control (PCC) system with a first Policy and Charging Rules Function (PCRF) server in standby mode, a second PCRF server in active mode, and a PCRF client, wherein an Internet Protocol Connectivity Access Network (IP CAN) session is already established with a user entity (UE) and controlled by the second PCRF server, the method comprising:
   receiving at a network interface unit of the PCRF client a modification of the IP-CAN session, from the UE or from a network node, after the second PCRF server has failed;
   sending a request from the interface unit of the PCRF client to the first PCRF server, by using a PCRF identifier of the second PCRF server, for new control rules for the IP-CAN session, the request including modification data and excluding access data and supported features for the IP-CAN session, the first PCRF server now in active mode, the first PCRF server sharing the PCRF identifier with the second PCRF server that has failed;
   receiving at the network interface unit of the PCRF client a request from the first PCRF server requesting all information that the PCRF client has regarding the IP-CAN session, the information including all data required to be sent for the IP-CAN session establishment and synchronization data;
   sending from the network interface unit of the PCRF client to the first PCRF server all the information the PCRF client has in a memory of the PCRF client regarding the IP-CAN session, including access data, supported features, and IP-CAN session establishment data as synchronization data;
   receiving at the network interface unit of the PCRF client from the first PCRF server the new control rules for the IP-CAN session; and
   enforcing the new control rules with a processing unit of the PCRF client for the IP-CAN session.

8. The method of claim 7, further comprising sending as synchronization data from the network interface unit of the PCRF client to the first PCRF server currently installed control rules for the IP-CAN session.

9. The method of claim 8, further comprising receiving at the network interface unit of the PCRF client from the first PCRF server indications to delete one or more previously installed control rules, and deleting by the processing unit of the PCRF client those previously installed control rules as indicated.

10. The method of claim 7, further comprising storing in the memory of the PCRF client the access data, the supported features and the control rules for the IP-CAN session received from the second PCRF server before the second PCRF server has failed.

11. A first Policy and Charging Rules Function (PCRF) server for recovery of a Policy and Charging Control (PCC) system, the PCC system also having a second PCRF server previously in charge of controlling an Internet Protocol Connectivity Access Network (IP-CAN) session previously established with a user entity (UE), and a PCRF client, the first PCRF server comprising:
   a network interface unit configured for receiving a modification request of the IP-CAN session from the PCRF client after failure of the second PCRF server which was in active mode, the first PCRF server having a PCRF identifier which is shared with the second PCRF server that has failed, the first PCRF server now in active mode, the modification request requesting new rules for the IP-CAN session, including modification data and excluding access data and supported features for the IP-CAN session; and
   a processing unit configured for determining that the IP-CAN session is unknown, and for submitting a request from the network interface unit of the first PCRF server to the PCRF client to provide all information that the PCRF client has regarding the IP-CAN session, the information including all data required to be sent for the IP-CAN session establishment and synchronization data.

12. The first PCRF server of claim 11, wherein the network interface unit is configured for receiving all the information the PCRF client has regarding the IP-CAN session, including access data, supported features, and IP-CAN session establishment data as synchronization data.

13. The first PCRF server of claim 12, wherein the network interface unit is configured for receiving as synchronization data from the PCRF client currently installed control rules for the IP-CAN session.

14. The first PCRF server of claim 13, wherein the processing unit is configured for processing the received modification data and synchronization data regarding the IP-CAN session in order to generate new control rules for the IP-CAN session.

15. The first PCRF server of claim 14, wherein the network interface unit is configured for submitting the new control rules for the IP-CAN session to the PCRF-client.

16. A Policy and Charging Rules Function (PCRF) client for recovery of a Policy and Charging Control (PCC) system, the PCC system also having a first Policy PCRF server in standby mode, and a second PCRF server in active mode, wherein an Internet Protocol Connectivity Access Network (IP CAN) session is already established with a user entity (UE) and controlled by the second PCRF server, the PCRF client comprising:
 a network interface unit configured for receiving a modification of the IP-CAN session, from the UE or from a network node, after the second PCRF server has failed;
 a processing unit configured for submitting a request from the network interface unit to the first PCRF server using a PCRF identifier of the second PCRF server for new control rules for the IP-CAN session, the request including modification data and excluding access data and supported features for the IP-CAN session, the first PCRF server now in active mode, the first PCRF server sharing the PCRF identifier with the second PCRF server that has failed;
 a memory in communication with the network interface unit and the processing unit configured for storing IP-CAN session information;
 wherein the network interface unit is configured for receiving a request from the first PCRF server requesting all information that the PCRF client has regarding the IP-CAN session, the information including all data required to be sent for the IP-CAN session establishment and synchronization data; and
 the network interface unit is configured for sending to the first PCRF server all the information the PCRF client has in the memory regarding the IP-CAN session, including access data, supported features, and IP-CAN session establishment data as synchronization data;
 the network interface unit is configured for receiving from the first PCRF server the new control rules for the IP-CAN session; and
 the processing unit is configured for enforcing the new control rules for the IP-CAN session.

17. The PCRF client of claim 16, wherein the network interface unit is configured for sending to the first PCRF server currently installed control rules for the IP-CAN session as synchronization data.

18. The PCRF client of claim 17, wherein the network interface unit is configured for receiving from the first PCRF server indications to delete one or more previously installed control rules, and the processing unit is configured for deleting those previously installed control rules as indicated.

19. The PCRF client of claim 16, wherein the memory is configured for storing the access data, the supported features and the control rules for the IP-CAN session received from the second PCRF server before the second PCRF server has failed.

20. A non-transitory computer-readable medium having stored instructions that, when executed by a computer, cause the computer to carry out a method for recovery of a Policy and Charging Control (PCC) system with a first Policy and Charging Rules Function (PCRF) server in standby mode, a second PCRF server in active mode, and a PCRF client, wherein an Internet Protocol Connectivity Access Network (IP-CAN) session is already established with a user entity (UE) and controlled by the second PCRF server, and the method comprises:
 receiving at a network interface unit of the first PCRF server a modification request of the IP-CAN session from the PCRF client after failure of the second PCRF server which was in active mode, the first PCRF server having a PCRF identifier which is shared with the second PCRF server that has failed, the first PCRF server now in active mode, the modification request requesting new rules for the IP-CAN session including modification data and excluding access data and supported features for the IP-CAN session;
 determining by a processing unit of the first PCRF server that the IP-CAN session is unknown; and
 sending a request from the network interface unit of the first PCRF server to the PCRF client to provide all information that the PCRF client has regarding the IP-CAN session, the information including all data required to be sent for the IP-CAN session establishment and synchronization data.

21. A non-transitory computer-readable medium having stored instructions that, when executed by a computer, cause the computer to carry out a method for recovery of a Policy and Charging Control (PCC) system with a first Policy and Charging Rules Function (PCRF) server in standby mode, a second PCRF server in active mode, and a PCRF client, wherein an Internet Protocol Connectivity Access Network (IP CAN) session is already established with a user entity (UE) and controlled by the second PCRF server, the method comprising:
 receiving at a network interface unit of the PCRF client a modification of the IP-CAN session, from the UE or from a network node, after the second PCRF server has failed;
 sending a request from the interface unit of the PCRF client to the first PCRF server, by using a PCRF identifier of the second PCRF server, for new control rules for the IP-CAN session, the request including modification data and excluding access data and supported features for the IP-CAN session, the first PCRF server now in active mode, the first PCRF server sharing the PCRF identifier with the second PCRF server that has failed;
 receiving at the network interface unit of the PCRF client a request from the first PCRF server requesting all information that the PCRF client has regarding the IP-CAN session, the information including all data required to be sent for the IP-CAN session establishment and synchronization data;
 sending from the network interface unit of the PCRF client to the first PCRF server all the information the PCRF client has in a memory of the PCRF client regarding the IP-CAN session, including access data, supported features, and IP-CAN session establishment data as synchronization data;
 receiving at the network interface unit of the PCRF client from the first PCRF server the new control rules for the IP-CAN session; and
 enforcing the new control rules with a processing unit of the PCRF client for the IP-CAN session.

* * * * *